United States Patent [19]
Leavitt

[11] Patent Number: 5,769,928
[45] Date of Patent: Jun. 23, 1998

[54] PSA GAS PURIFIER AND PURIFICATION PROCESS

[75] Inventor: Frederick Wells Leavitt, Amherst, N.Y.

[73] Assignee: Praxair Technology, Inc., Danbury, Conn.

[21] Appl. No.: 766,443

[22] Filed: Dec. 12, 1996

[51] Int. Cl.[6] .................................................. B01D 53/047
[52] U.S. Cl. .................................. 95/95; 95/119; 95/121; 95/139; 95/143; 95/145; 96/130; 96/132; 96/144; 96/154
[58] Field of Search ...................... 95/95–106, 117–126, 95/145; 96/108, 121–123, 130–133, 144, 154

[56] References Cited

U.S. PATENT DOCUMENTS

| | | | |
|---|---|---|---|
| 3,287,884 | 11/1966 | Scofield | 95/145 |
| 4,153,429 | 5/1979 | Matthews et al. | 95/117 |
| 4,544,384 | 10/1985 | Metschl et al. | 96/130 |
| 4,572,178 | 2/1986 | Takase et al. | 96/132 X |
| 4,711,645 | 12/1987 | Kumar | 95/122 X |
| 5,169,413 | 12/1992 | Leavitt | 96/130 X |
| 5,232,474 | 8/1993 | Jain | 95/97 |
| 5,324,159 | 6/1994 | Nowobilski et al. | 414/301 |
| 5,447,558 | 9/1995 | Acharya | 96/132 X |
| 5,451,248 | 9/1995 | Sadkowski et al. | 95/105 X |
| 5,520,721 | 5/1996 | Fraysse et al. | 96/132 X |
| 5,529,610 | 6/1996 | Watson et al. | 96/130 X |
| 5,536,301 | 7/1996 | Lansbarkis et al. | 95/126 X |
| 5,593,475 | 1/1997 | Minh | 96/132 X |
| 5,620,504 | 4/1997 | Coates | 96/133 X |
| 5,624,477 | 4/1997 | Armond | 96/132 X |

FOREIGN PATENT DOCUMENTS

| | | | |
|---|---|---|---|
| 3045451A1 | 7/1981 | Germany . | |
| 52-031559 | 3/1977 | Japan | 96/122 |
| 1068150 | 1/1984 | U.S.S.R. | 95/119 |
| 2189167 | 10/1987 | United Kingdom | 96/131 |

*Primary Examiner*—Robert Spitzer
*Attorney, Agent, or Firm*—Robert J. Follett

[57] ABSTRACT

The invention comprises a PSA gas prepurifier for the removal of contaminants present in a feed gas stream. The prepurifier of the invention has a bed of adsorbent material which comprises at least two discrete layers of adsorbents, at least one of the adsorbents being comparatively strong and at least another of the adsorbents being comparatively weak.

20 Claims, 1 Drawing Sheet

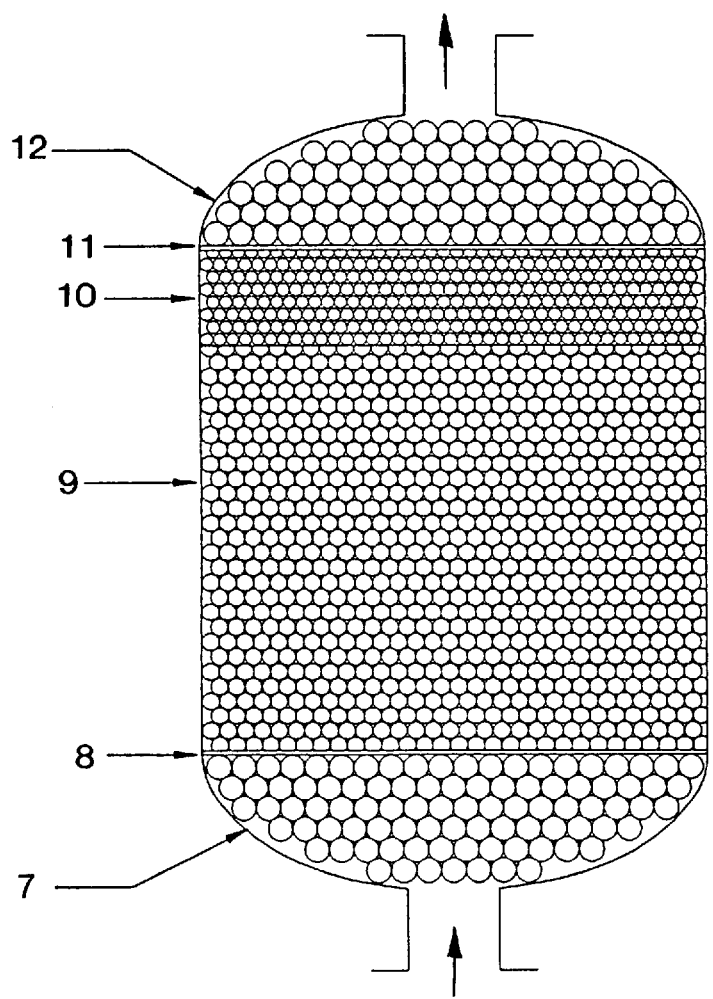

PSA GAS PURIFIER AND PURIFICATION PROCESS

FIELD OF THE INVENTION

This invention relates generally to pressure swing adsorption (PSA) air separation processes and systems. In particular, it relates to PSA air prepurification.

BACKGROUND

The operation of cryogenic air separation plants requires large quantities of pretreated air. To prevent freezing at the cold feed end of the plant, the concentration of contaminants such as $CO_2$ and $H_2O$ must be lowered to less than 1 ppm. In addition, the concentration of those hydrocarbons which have a low solubility in cryogenic liquids, such as acetylene and certain $C^3$–$C^8$ hydrocarbons, must be kept very low, typically less than 1 ppb, to eliminate any safety hazard. Currently both Thermal Swing Adsorption (TSA) and Pressure Swing Adsorption (PSA) prepurifiers are used in air prepurification applications.

TSA prepurifiers use a relatively small amount of heated purge gas to regenerate the adsorption beds. The typical purge to feed ratio is $\leq 10\%$. They are extremely effective at removing the major contaminants such as $CO_2$, $H_2O$ and most of the hydrocarbons from an air feed. Any CO and $H_2$ contained in the feed is generally carried over into the product. If it is necessary to remove the CO and $H_2$, a sequential oxidation of the CO and $H_2$ is carried out by catalytic conversion. Due to the large thermal driving forces available in TSA prepurifiers during desorption, strong adsorbents such as 5A or 13X zeolite are used. With these adsorbents, the operating loading and selectivity of the major contaminants is such that $CO_2$ breaks through into the product stream before acetylene, and other hydrocarbons, which are harmful to cryogenic air separation plant operation (e.g., $C_3$ through $C_8$).

To increase the capacity of these adsorbents, the feed gas is usually chilled. While the TSA process has a relatively low purge to feed ratio, the necessity of heating the purge and chilling the feed adds to both the capital and operating cost of the plants.

PSA prepurifiers use an ambient temperature purge to regenerate the adsorption beds. The typical purge to feed ratio is 40–60%. Due to the lower driving forces present during desorption, a weaker adsorbent, such as activated alumina is used.

While the operating loadings of these adsorbents are less than those of the zeolites, they are still significant. Further, we have found that when using activated alumina, $C_2H_2$ breaks through into the product stream before $CO_2$. This leads to a hazardous operating condition in a cryogenic air separation process which uses the prepurifier product as feed. In addition, while the capital costs associated with a PSA prepurifier are lower than those of a TSA, the overall power requirement can be higher. In particular, the PSA cycle requires power consuming blowdowns during depressurization of the adsorption beds. This is significant as compared to a TSA cycle because, in contrast to a TSA process which cycles only every 3 to 6 hours, a PSA process cycles every 15–30 minutes.

In light of the above considerations, there is a need in the art to design a PSA adsorbent bed which possesses the favorable desorption characteristics of activated alumina and yet has the acetylene selectivity and loadings associated with the more strongly held zeolites. In addition, there is a need to minimize blowdown losses in order to reduce operating power. Several alternatives have been proposed.

Hitachi, in German patent application 3045451, discloses a two bed adsorbent system. The first adsorbent is 13X which is used to adsorb high concentrations of both $H_2O$ and $CO_2$, thus suppressing the co-adsorption of nitrogen. The second adsorbent is activated alumina which does not co-adsorb nitrogen very strongly. It is used to complete the $H_2O$ and $CO_2$ adsorption. By minimizing the nitrogen co-adsorption in the beds, blowdown losses during depressurization are likewise minimized.

Kumar, in U.S. Pat. No. 4,711,645, describes a PSA prepurifier which uses activated alumina to adsorb $H_2O$ and 13X to adsorb $CO_2$. The use of activated alumina to adsorb $H_2O$ results in a lower temperature rise in the feed than if 13X were used for the whole bed. This increases the effective capacity of the 13X zone to adsorb $CO_2$. Other zeolites suggested by Kumar for the second zone are 5A, CaA, CaX and Na-mordenite.

Jain, in U.S. Pat. No. 5,232,474 also uses a layer of activated alumina followed by a layer of 13X. Here it is claimed that the activated alumina layer is used to adsorb all the $H_2O$ and the majority of the $CO_2$. The purpose of the downstream 13X layer is to remove hydrocarbons and residual $CO_2$ from the gas stream. It is specifically taught that the 13X layer is not intended to remove large amounts of $CO_2$. This PSA cycle is designed to operate with adsorption beds containing smaller diameter adsorbent beads and does not have a conventional pressure equalization step.

OBJECTS OF THE INVENTION

In light of the above, it is therefore an object of the invention to provide an improved PSA prepurification process and system.

It is a further object of the invention to provide a flexible PSA prepurification process and system that ensures more efficient removal of contaminants as compared to existing prior art systems.

It is a further object of the invention to provide a PSA prepurification process and system that requires less power than existing prior art systems.

It is a further object of the invention to provide a PSA prepurification process and system that is inherently safe to operate under the conditions mentioned herein.

SUMMARY OF THE INVENTION

The invention comprises a PSA gas prepurifier for the removal of water and other contaminants present in a feed gas stream. The prepurifier of the invention has a bed of adsorbent material which comprises at least two discrete layers of adsorbents, at least one of said adsorbents being comparatively strong and at least another of said adsorbents being comparatively weak with respect to the adsorption of said water and other contaminants.

In preferred embodiments the comparatively strong adsorbent is NaY and the comparatively weak adsorbent is activated alumina.

BRIEF DESCRIPTION OF THE DRAWINGS

Other objects, features and advantages will occur to those skilled in the art from the following description of preferred embodiments and the accompanying drawing, in which:

FIG. 1 is a schematic diagram of an embodiment of the invention.

DETAILED DESCRIPTION OF THE INVENTION

The PSA prepurifier adsorbent bed described herein provides enhanced performance (e.g., longer adsorption step times and smaller blowdown losses) which results in a more efficient removal of the contaminants. In addition, due to the system and process of the invention, $CO_2$ breaks through the bed into the product stream prior to $C_2H_2$, thus providing safer operation conditions. Finally, our tests have shown that this method is applicable over a wide range of operating conditions including adsorption pressure and feed temperature. This invention may be accomplished in the manner hereinafter described.

The essence of this invention is the use of two separate layers of adsorbents with different properties to attain a better separation and lower cost performance than either of the two adsorbents can accomplish separately. The thermal effects of the process, on the stronger adsorbent, are moderated so that both the adsorption and desorption performance of the adsorbent is improved, and the amount of purge gas required to make the cycle self-cleaning is decreased. We should note that the term "self-cleaning" is generally understood in the art to mean that condition were adsorbates are sufficiently purged during a cycle such that their average residual loading, e.g. the amount of adsorbate retained on the adsorbent, is not increasing with time.

NaY is generally considered to be a weak adsorbent when compared to adsorbents such as 13X, 5A, CaA, CaX and Na-mordinite. For example, its capacity for $N_2$, $O_2$, and $CO_2$ is less than half that of 13X. This means that NaY will have lower blowdown losses and require less purge than these stronger adsorbents.

Compared to activated alumina, however, NaY is a strong adsorbent. Our isothermal breakthrough tests have shown that the equilibrium capacity of NaY for acetylene is about ten times greater than that of activated alumina. Further NaY will preferentially adsorb acetylene over $CO_2$ at the concentrations found in the feed of PSA prepurifiers. These concentrations are typically less than 1 ppm.

Unfortunately, these tests also indicated that NaY requires more purge than activated alumina for the effective desorption of acetylene. The increased purge requirement will be even greater in adiabatic beds where temperature shifts occur during blowdown.

In light of the above properties, the invention comprises the use of a comparatively stronger adsorbent: (preferably NaY) and a comparatively weaker adsorbent (preferably activated alumina particles) in separate layers or zones within the bed. In a preferred embodiment, the stronger adsorbent is situated in the warmer product end of the bed. This moderates the thermal effects of the PSA process by reducing the nitrogen co-adsorption during the feed step and lowering the amount of purge gas required for desorption. In addition, in a layer containing 20% NaY for example, the breakthrough capacity of the layered bed will be more than twice that of a pure activated alumina layer. All of these features have a favorable impact on the operating cost of the PSA prepurification cycle.

In addition, the comparatively strong adsorbent is self-cleaning with respect to said at least one of acetylene or C3–C8 hydrocarbons at a lesser purge than would be required for 13X.

The above embodiment is shown in FIG. 1. In the bed described in this Figure, a layer of activated alumina is used to remove the bulk of the $H_2O$ and $CO_2$ from the feed stream, and a smaller layer of NaY is used to remove the remaining impurities from the feed. The direction of fluid flow is indicated by the arrows.

FIG. 1 shows a PSA prepurifier adsorbent bed according to the invention. In FIG. 1, the lower header is filled with inert ceramic balls 7 which act as both flow distribution and bed support. A stainless steel screen 8 supports the adsorbent bed. The bed itself consists of two layers. The lower and larger layer is activated alumina 9; the smaller upper layer is NaY 10. The upper bed surface is constrained by a second stainless steel screen 11 which is held in place by an additional layer of ceramic balls 12 which fill the upper header. The ceramic balls 12 in the header spaces may be graded to provide improved distribution.

In the operation of the invention, selection of the proper adsorbent for the product end of the bed is critical to the invention. The adsorbent selected must, strongly adsorb acetylene and other hydrocarbons and it must be selective for hydrocarbons over $CO_2$ such that $CO_2$ always breaks through the bed prior to those hydrocarbons (e.g. acetylene) which are hazardous to plant operation. In addition, it should not be a strong co-adsorber of $N_2$ or $O_2$ at the process operating conditions. If it were, cooling would not be suppressed during depressurization, due to the heat of adsorption. This would cause the adsorbates to be more strongly held on the adsorbent during the desorption step, and consequently a larger purge would be required.

The use of a properly sized layer of NaY in the warm (product) end of a PSA prepurifier which uses activated alumina to remove the bulk of the $CO_2$ and $H_2O$, significantly improves the economics of the cycle. It also increases the retention time of the acetylene in the bed, insuring that the $CO_2$ front breaks through first.

In the invention the amount of NaY used in the beds is an economic issue. Optimization of the cycle will depend in part on the relative cost of power, the quantity of hydrocarbons to be removed, and the operating efficiency of the air separation plant being serviced.

The preferred ratio of NaY to activated alumina is between 10% NaY/90% activated alumina and 90% NaY/10% activated alumina.

A more preferred ratio will be between 10% NaY/90% activated alumina and 50% NaY/50% activated alumina. The most preferred ratio will be between 10% NaY/90% activated alumina and 30% NaY/70% activated alumina. The above ratios apply to the amount of activated alumina in the first layer as compared the amount of NaY in the second layer.

We should note that stronger adsorbents could be re-engineered, by methods known in the art, to create adsorbents having the properties of NaY. Such methods may include, but are not limited to changing the $SiO_2/Al_2O_3$ ratio, crystal content, percent binder and residual $H_2O$ content. For example, 13X and 5A could be modified in the manner described above to yield an adsorbent having reduced nitrogen co-adsorption and sufficient capacity for the more strongly held adsorbates (e.g., $C_2H_2$, $CO_2$).

When NaY is used as the stronger adsorbent, it must be dried thoroughly prior to use and kept dry. Preferably, water loadings on the NaY should be equal to or less than 4wt. %, more preferably less than 2wt. % and most preferably less than 0.8wt. %. In the operation of the invention, the activated alumina can be loaded and dried in-situ.

Particle distribution in the bed must be uniform to insure contacting all of the contaminants. Uniform flow distribution and pressure characteristics in the bed are necessary to insure proper performance. Use of the particle loader, described in commonly assigned U.S. Pat. No. 5,324,159, makes uniform loading of the vessels relatively simple. Controlling the speed of rotation of the distribution arms will allow adjustment of the packing density.

As an example, a two bed PSA air prepurifier designed to supply product with $CO_2 \leq 0.25$ ppm, $H_2O \leq 0-1$ ppm and $C_2H_2 \leq 1$ ppb and having the configuration as shown in FIG. 1 would be operated under the following parameters, and possess the following characteristics:

Feed Conditions:
Feed Flow=7,500 to 16,000 $SCFH/FT^2$ of air containing 0.33 ppm $C_2H_2$
Temperature=50 to 120°F.
Pressure=100 to 140 PSIA
Adsorption Time=7 to 35 minutes
Regeneration Conditions:
Purge/Feed Ratio=40 to 60%
Temperature=ambient (bed)
Pressure=atmospheric
Purge Time=between about 1 to 1.5 times the adsorption time.
Adsorbents:
LaRouche A-201(7×12 beads) activated alumina
UOP NaY(1/16" extrudate)
Beds (specific example)
Total Bed Depth=6.25 feet
Activated Alumina layer=5.00 feet
NaY Layer=1.25 feet Preferably, the PSA prepurifier according to the invention could be operated at a feed temperature of about 40–120° F., a feed pressure of about 30–240 psia and a regeneration pressure of about atmospheric pressure. The performance advantages of the invention using NaY will be greatest when the operating temperature exceeds 100° F. and the purge to feed ratio is equal to or greater than 50%.

The processes of the invention are not limited to the single bed configuration set forth in the Figure. The design of efficient adsorber beds for pressure swing adsorption cycles and the operation of these cycles is effected by means well-known in the art. For example, the invention may be practiced using one or more beds which operate out of phase. Other embodiments, though less preferred, include one wherein the NaY layer may be placed anywhere in the bed where the $H_2O$ concentration is low enough to permit the selective adsorption of $C_2H_2$ over $CO_2$, as well as an embodiment wherein the entire bed is NaY. As noted previously, NaY will perform best in the warmer, drier product end of the bed.

The invention offers several advantages over known PSA prepurifiers. First, the invention provides for the complete removal, from air, of $C_2H_2$ to less than 1 ppb. This ensures safe operation of the associated air separation plant facility.

In addition, the invention provides for consistent; breakthrough of the $CO_2$ adsorption front prior to $C_2H_2$ breakthrough. This provides a relatively simple means of determining that the process is safe, as prepurifier feed steps are usually terminated at the beginning of the $CO_2$ adsorption front breakthrough.

Further, the overall operating cost of the layered PSA bed is less than that of a single adsorbent alumina bed. This is in large part due to the longer adsorption step times and hence smaller blowdown losses experienced.

Finally, the system requires no additional system hardware and can be implemented in existing vessels.

Specific features of the invention are shown in one or more of the drawings for convenience only, as each feature may be combined with other features in accordance with the invention. Alternative embodiments will be recognized by those skilled in the art and are intended to be included within the scope of the claims.

what is claimed is:

1. A process for purifying a gas stream, said process comprising passing said gas stream through a pressure swing adsorption vessel containing a bed of adsorbent material capable of selectively adsorbing contaminants present in said feed gas stream at a high adsorption pressure and desorbing said contaminants at a low desorption pressure, the adsorption vessel containing a bed of adsorbent material capable of selectively adsorbing said contaminants present in said feed gas stream at the high adsorption pressure and desorbing said contaminants at the low desorption pressure, the adsorption vessel having a feed end for the introduction of said feed gas stream thereto and a product end for the recovery of purified feed gas therefrom, wherein said bed of adsorbent material comprises at least two layers of adsorbents, at least one of said adsorbents being comparatively strong and at least another of said adsorbents being comparatively weak with respect to the adsorption of said contaminants, wherein said comparatively strong adsorbent preferentially adsorbs at least one of acetylene or C3–C8 hydrocarbons over $CO_2$, and wherein said comparatively strong adsorbent is self-cleaning with respect to said acetylene or C3–C8 hydrocarbons at a lesser purge than would be required for 13X.

2. A process for purifying a gas stream, said process comprising passing said gas stream through a pressure swing adsorption vessel containing a bed of adsorbent material capable of selectively adsorbing contaminants present in said feed gas stream at a high adsorption pressure and desorbing said contaminants at a low desorption pressure, the adsorption vessel containing a bed of adsorbent material capable of selectively adsorbing said contaminants present in said feed gas stream at the high adsorption pressure and desorbing said contaminants at the low desorption pressure, the adsorption vessel having a feed end for the introduction of said feed gas stream thereto and a product end for the recovery of purified feed gas therefrom, wherein said bed of adsorbent material comprises at least two layers, and wherein a first layer is NaY and a second layer is activated alumina.

3. The process of claim 2, wherein the ratio of NaY to activated alumina is between 10%/90% and 90%/10%.

4. The process of claims 2, wherein said feed gas is air.

5. The process of claim 2, wherein said contaminants are at least one of water, acetylene, $CO_2$ and $C^3$–$C^8$ hydrocarbons.

6. The process of claim 2, wherein said layer of activated alumina is between said feed end of said bed and said layer NaY.

7. A pressure swing adsorption gas purifier for the adsorption of contaminants present in a feed gas stream at a high adsorption pressure and for the desorption of said contaminants at a low desorption pressure, said purifier comprising:

an adsorption vessel containing a bed of adsorbent material capable of selectively adsorbing said contaminants present in said feed gas stream at the high adsorption pressure and desorbing said contaminants at the low desorption pressure, the adsorption vessel having a feed end for the introduction of said feed gas stream thereto and a product end for the recovery of purified feed gas therefrom, wherein said bed of adsorbent material comprises at least two layers of adsorbents, at least one of said adsorbents being comparatively strong and at least another of said adsorbents being comparatively weak with respect to the adsorption of said contaminants, wherein said comparatively strong adsorbent preferentially adsorbs at least one of acetylene or C3–C8 hydrocarbons over $CO_2$, and wherein said comparatively strong adsorbent is self-cleaning with respect to said acetylene or C3–C8 hydrocarbons at a lesser purge than would be required for 13X adsorbent.

8. The prepurifier of claim 7, wherein said comparatively strong adsorbent is NaY.

9. The prepurifier of claim 7, wherein said comparatively weak adsorbent is activated alumina.

10. The purifier of claim 7, wherein said comparatively weak adsorbent is activated alumina and said comparatively strong adsorbent is NaY, and wherein the ratio of NaY to activated alumina is between 10%/90% and 90%/10%.

11. The purifier of claim 7, wherein said comparatively weak adsorbent is activated alumina and said comparatively strong adsorbent is NaY, and wherein the ratio of NaY to activated alumina is between 10%/90% and 50%/50%.

12. The purifier of claim 7, wherein said comparatively weak adsorbent is activated alumina and said comparatively strong adsorbent is NaY, and wherein the ratio of NaY to activated alumina is between 10%/90% and 30%/70%.

13. The purifier of claim 7, wherein said feed gas is air.

14. The purifier of claim 7, wherein said contaminants are at least one of water, acetylene, $CO_2$ and $C^3$–$C^8$ hydrocarbons.

15. The purifier of claim 7, wherein said layer of comparatively weak adsorbent is between said feed end of said bed and said layer of comparatively strong adsorbent.

16. A pressure swing adsorption gas purifier for the adsorption of contaminants present in a feed gas stream at a high adsorption pressure and for the desorption of said contaminants at a low desorption pressure, said purifier comprising:

an adsorption vessel containing a bed of adsorbent material capable of selectively adsorbing said contaminants present in said feed gas stream at the high adsorption pressure and desorbing said contaminants at the low desorption pressure, the adsorption vessel having a feed end for the introduction of said feed gas stream thereto and a product end for the recovery of purified feed gas therefrom, wherein said bed of adsorbent material comprises at least two layers, and wherein a first layer is NaY and a second layer is activated alumina.

17. The purifier of claim 16, wherein the ratio of NaY to activated alumina is between 10%/90% and 90%/10%.

18. The purifier of claim 16, wherein said feed gas is air.

19. The purifier of claim 16, wherein said contaminants are at least one of water, acetylene, $CO_2$ and $C^3$–$C^8$ hydrocarbons.

20. The purifier of claim 16, wherein said layer of activated alumina is between said feed end of said bed and said layer of NaY.

* * * * *